(12) United States Patent
Tsampalis et al.

(10) Patent No.: US 7,620,385 B2
(45) Date of Patent: Nov. 17, 2009

(54) SYSTEM AND METHOD FOR ENHANCED SECRET MODE

(75) Inventors: Ioannis Tsampalis, Palatine, IL (US); Qihua Chen, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 636 days.

(21) Appl. No.: 11/167,795

(22) Filed: Jun. 27, 2005

(65) Prior Publication Data

US 2006/0294374 A1     Dec. 28, 2006

(51) Int. Cl.
*H04M 3/16* (2006.01)
(52) U.S. Cl. .................. 455/410; 455/411
(58) Field of Classification Search ......... 455/411, 455/41.2, 406, 419, 410, 553.1, 464, 412.1–2, 455/417, 425, 445, 458, 556.2, 566; 713/166
See application file for complete search history.

(56) References Cited

U.S. PATENT DOCUMENTS 5,928,364 A * 7/1999 Yamamoto .................. 726/18
6,118,872 A * 9/2000 Kashima et al. ............. 380/205
6,405,060 B1 * 6/2002 Schroeder et al. ........... 455/566

FOREIGN PATENT DOCUMENTS

| JP | 5-75576 | 3/1993 |
|----|---------|--------|
| JP | 8-205223 | 8/1996 |
| JP | 2002-259313 | 9/2002 |

* cited by examiner

*Primary Examiner*—CongVan Tran
(74) *Attorney, Agent, or Firm*—Hisashi D. Watanabe

(57) ABSTRACT

Disclosed is a system and method in a communication device configured with a secret mode capability and a plurality of applications. The system and method includes flagging particular data (107) as secret data (402) in a first one of the plurality of applications (316) to form originally flagged secret data and then correlating the originally flagged secret data with other data associated with at least one of the other of the plurality of applications (318, 320 & 322) to process the other data into similarly flagged secret data.

12 Claims, 5 Drawing Sheets

```
┌─────────────────────────────────┐
│  WHILE SECRET MODE IS ON,       │
│  EVERY TIME :                   │
│  (I) A NEW APPLICATION ENTRY IS │
│      CREATED                    │
402─│  (E.G., A NEW SECRET MODE       │
│    PHONEBOOK ENTRY), OR         │
│  (II) AN EXISTING SECRET MODE   │
│  APPLICATION ENTRY IS EDITED    │
│         OR DELETED              │
└─────────────────────────────────┘
              │
              ▼
┌─────────────────────────────────┐
│   FOR ALL DATA STORED IN        │
│ COMMUNICATION DEVICE INTERNAL   │
│ MEMORY AND IN EXTERNAL MEMORY   │
│ (E.G. SIM, UICC, MM CARD) UPDATE│
│    THE EXISTING SECRET FLAG BY  │
404─│   CHECKING IF THE MODIFIED      │
│  APPLICATION ENTRY VALUES MATCH │
│  WITH THE APPROPRIATE FIELDS OF │
│ EACH DATA ENTRY (E.G. 'TO' FOR THE│
│   INCOMING MESSAGES, 'FROM' FOR │
│      THE OUTGOING MESSAGES)     │
└─────────────────────────────────┘
```

*FIG. 4*

SYSTEM AND METHOD FOR ENHANCED SECRET MODE

FIELD OF THE INVENTION

This disclosure in general relates to secret or mistress mode in a communication device. More particularly, it relates to the synchronization of secret flagged data across the data in data folders of applications installed on a communication device.

BACKGROUND

As circuit technology advances to create smaller circuits, software technology advances to provide a plethora of applications to cellular telephones. Today, cellular telephones are capable of operating as many applications as personal computers were in the past. Programs for cellular telephones may be installed at their manufacture, or may be downloaded via their wireless networks. A Personal Computer Memory Card International Association (PCMCIA card) or the like may also be inserted into the telephone itself to install applications if the telephone is equipped with an appropriate port.

One such application is "secret mode" or "mistress mode" which allows a user to categorize certain identity data as secret and store the designation in the communication device. For example, when receiving a call previously categorized, identified or designated as secret in the incoming call application by the user or other entity, the processor of the telephone will divert the call signal, so that the telephone will not ring. The call will be diverted into a file or folder that contains incoming messages and then flag the message data as a secret mode message. The user will then be able to access the secret mode message file with a password.

Currently, the data stored in each application's data folder are independently designated as secret by the user. Each secret designation is independent per application. Accordingly, the secret designation in one application is not shared by any other applications in communication device when secret mode is activated. The incoming call application, for example, requires manual input of a secret designation by the user of the caller's identity to provide the identity data with a secret flag. Were a user to use the secret mode application for the outbound calls application, the secret mode application would require further manual input of a secret designation of the same caller's identity data for the inbound calls application. Other applications operate in the same manner. Were a user to wish data be secret with respect to other applications installed on a communication device such as a telephone book, email address book, draft files and calendar, the user must redundantly enter the secret designation manually for data in the data folders for each application. In this way, if the user does not manually input secret designations for such identity data used in other applications of the communication device, otherwise secret data may be inadvertently displayed.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 shows a flow chart that provides exemplary conditions for the harmonization of secret flagged data.

Figure 1:
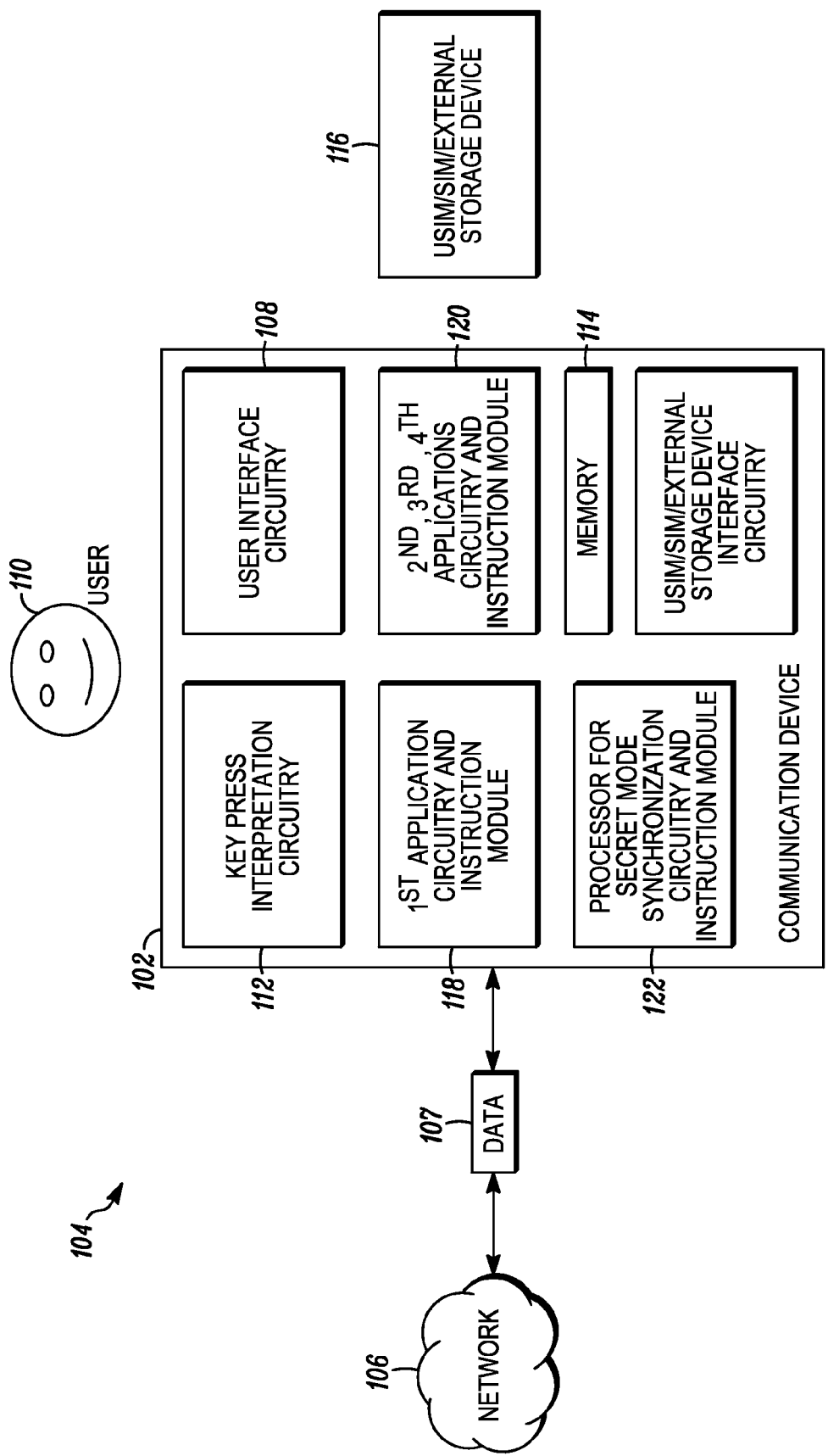
FIG. 1 shows some exemplary components of a communication system and device as described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to synchronization of secret flagged data across data folders of applications installed on a communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of synchronization of secret flagged data across data folders of applications installed on a communication device described herein. The non-processor circuits may include, but are not limited to, a radio receiver, a radio transmitter, signal drivers, clock circuits, power source circuits, and user input devices. As such, these functions may be interpreted as steps of a method to perform synchronization of secret flagged data across data folders of applications installed on a communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method, system and device for enhanced secret mode are described with respect to a number of different embodiments. FIG. 1 shows some exemplary components of a communication system and device. The device 102 and system 104 can include handheld wireless devices, for example, cellular phones, pagers, radios, personal digital assistants (PDAs), notebook or laptop computers incorporating wireless modems, mobile data terminals, application specific gaming devices, video gaming devices incorporating wireless modems, etc. These devices may be part of a wireless local area network (WLAN) or otherwise. The network 106 for example, can be one or more of cellular telephone networks, pager networks, and Internet networks. Such wireless networks may include land lines, radio links and satellite links, and may be used for such purposes as cellular phone systems, Internet systems, computer networks, pager systems and other satellite systems.

The communication device 102 can include, for example, standard applications for displaying identity data 107 received from network 106. The identity data 107 can reflect the identity of current incoming calls. The annunciation or display application by the user interface circuitry 108 can display, for example, data for incoming and outgoing calls. The user interface circuit 108 may annunciate data in any manner, including by audio, visual and audiovisual processes. For the incoming calls, the calls can be annunciated concurrently with their receipt, and then the received calls list folder can store the records of the caller's identities. For outgoing calls, the identity of the recipient may be annunciated by activating a "call back" button, and the dialed (outgoing) call list folder stores the records of the recipient's identities. Moreover, the user interface circuitry 108 can annunciate for example, messaging identity data, and identity data for incoming and outgoing email or SMS (Short Message Service) messaging lists, entries in a telephone book and calendar data. It is understood that other applications, including those that are user-defined and those that are not currently mentioned that include identity data 107 are within the scope of this discussion. The identity data 107 can be any type of identity data that may be flagged as secret identity data.

It is understood that the secret identity data that is processed by the disclosed secret mode manager includes any details of the identity or personal information that is designated as secret by the user. It is also understood that the communication device as described herein includes all forms of communication devices. For example, in network environment where, for example, a phonebook may be a network phonebook, the secret mode manager may operate in the same or similar manner as described with reference to a mobile communication device. While, messages received in a network may be communicated via a wireline, it is understood that this discussion includes wireline and wireless communication devices.

It is further understood that secret designation can apply to data stored in a communication device (of any type) as well as data stored in a network. As an example the user will not be notified about or be able to listen to messages stored in the voicemail (network-based) or the answering machine (communication device-based) if the message has been created by a source that is inside the communication device (via the user who accesses the message) and is identified as "secret." Only if the user enters the secret mode via password will the user be able to access the referenced information.

The user interface circuitry 108 includes a display that can provide prompts to the user 110, i.e., annunciation, for the purpose of appending identity data with a new field to mark or flag the data as secret. Alternatively, prompts to the user can be audio or otherwise. The interface 108 can include input capability 112 that may be tactile (such as a keypad), audio, a signal or a combination. The internal memory or data base 114 can maintain the flagged secret data in folders specific to the applications installed on the communication device 102. The external storage device 116 may provide any number of functions including providing downloaded instructions for new applications to the communication device.

The first application circuitry and/or instructions module 118 is adapted to provide the disclosed system and device the ability to recognize secret flagged data as secret and to treat it appropriately. When secret mode is on, the flagged secret data are not accessible by any application in the phone. The secret entries can be viewed by entering a password code. When the secret mode is off, the flagged secret data is accessible.

The second, third and fourth applications circuitry and/or instructions module 120 are adapted to provide the system and device the ability to recognize flagged data as secret and treat it appropriately as well. The circuitry and/or modules are intended to represent a plurality of applications configured to run on the communication device 102. In the interest of ease of illustration, circuitry and/or instructions module 120 is condensed to include second, third and fourth applications, which may separate circuitry or modules. There can also be additional application modules, fifth, sixth, seventh and so on, which, for example, can include but are not limited to message, phonebook and calendar applications.

The processor 122 for secret mode synchronization or correlation circuitry and/or instructions module is in communication with the memory 114. Memory 114 is configured to maintain application folders. It is understood that applications may share folders or that a folder of an application may be separated into more than one folder. The terms synchronization, harmonization, and correlation in the description of the secret mode manager as used herein mean that secret flagged data that is in the folder of one application in accordance with this disclosure is also made secret flagged data in the folder of another application. The terms harmonization and, synchronization are used interchangeably. The synchronization module can be generally thought of as having a flagging module and a correlating module. The flagging instruction module is for flagging particular identity data as secret data to form originally flagged secret data. A correlating instruction module is for correlating the originally flagged secret data with other identity data associated with at least one of the other of the plurality of applications to process the other identity data into similarly flagged secret data. The correlating module can include a processing instruction module is for recognizing other identity data the same or substantially the same as to the originally flagged secret data and then similarly for flagging the other identity data to form new flagged secret identity data. The architecture of the instruction modules may take any form to carry out the step of correlation.

It is further understood that synchronization, correlation, and harmonization of secret flagged data can apply between data stored in, for example, the communication device 102, data stored in the network 106, data stored in an external memory 116, and data stored in another communication device As will be described in detail below, processor 122 (or a collection of one or more processors depending upon the architecture of the communication device 102) is configured to harmonize the identity data that is in folders of the above-described applications. The particular identity data that is discussed herein may include for example, a name, a telephone number, or an email address. That particular data can be originally flagged secret data in a first application. That is, the user may access identity data of a first application, for example, phonebook data, and mark that data as secret data to form originally flagged secret data. It is understood that all types of data that may be processed according to the method and device described herein are within the scope of this discussion. The particular data as used herein may be of any type of identity data.

Figure 2:
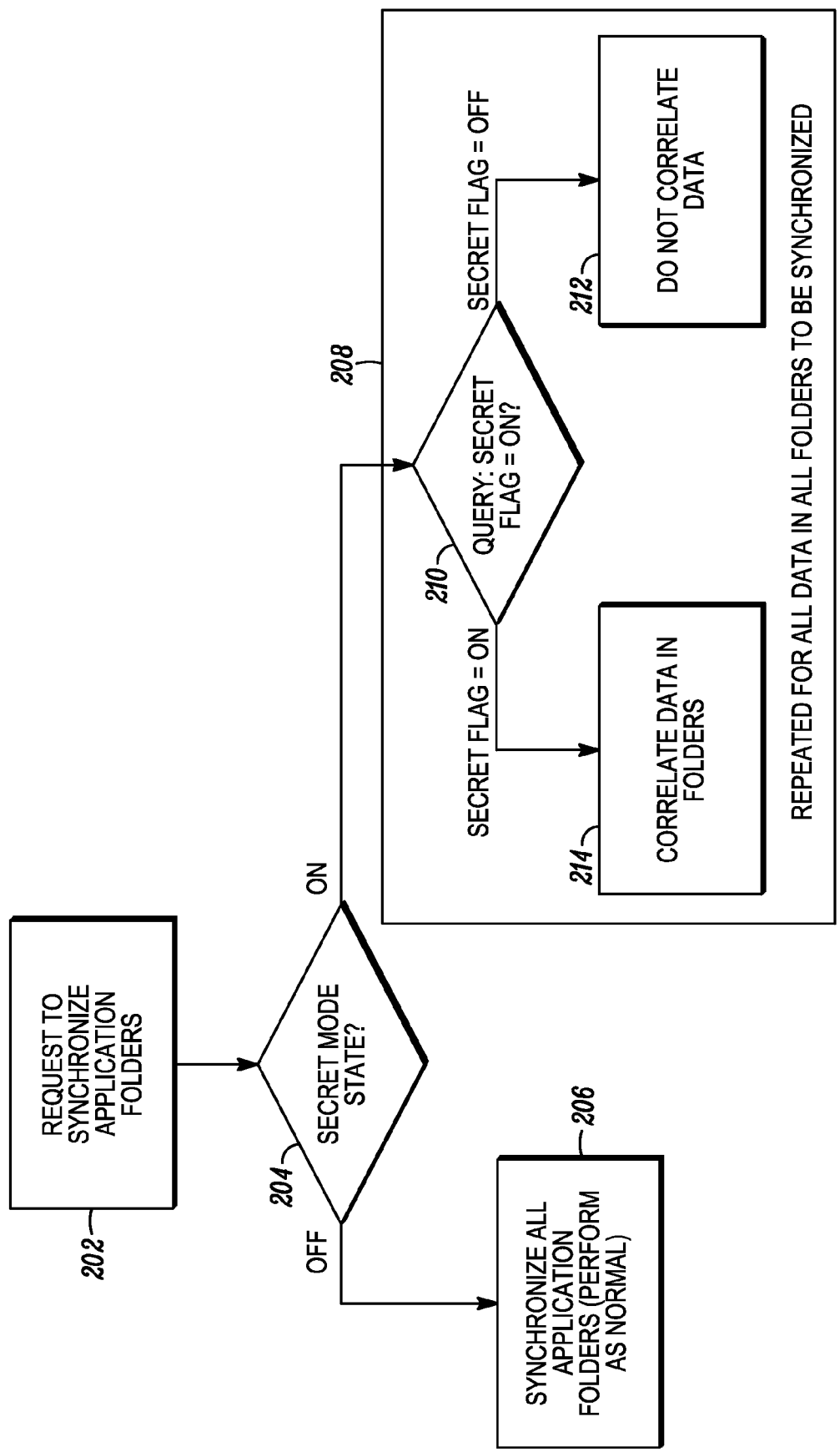
FIG. 2 is an example flow chart of a data synchronization process.

In harmonizing particular identity data as flagged data across the applications of the communication device 102, the processor 122 can access all or specific application's folders and then similarly flag substantially matching identity data to the originally flagged secret data in another application's folder. FIG. 2 is a flow chart of a data synchronization process. In one embodiment, identity data stored in the memory 114 for the applications are chosen by the user. The user 110 can access a prompt for a request to synchronize application folders 202. There is a query as to whether the secret mode is on or off 204. If the secret mode is off, a synchronization process 206 may proceed as it would otherwise. If the secret mode is on, then where one or more identity data is "flagged" as secret in one application, say in the telephone book, then that same identity data will be flagged in the folders for a plurality of other applications 208. It is understood that certain applications may also share folders. It is further understood, as discussed above, that the user may have user defined applications or there may be other applications not mentioned herein but that are within the scope of this discussion.

In flagging identity data, a new field is added internally for the message to mark or flag if the message is flagged as secret or not. The message may be, for example, SMS, email, MMS (Multimedia Messaging Service), EMS (Enhanced Messaging Service), or i-mode mail, message R/F, message C/D, broadcast message and message sent/received logs and any other type of messaging. Flagging the message occurs by an internal circuitry, for example, after the TO/FROM field are looked up against other applications entries (i.e. the phonebook entries). The secret mode circuitry discussed in detail below can access the secret data after the phone is powered on. Based on each message's secret flag, the communication device 102 shall decide whether to display the message to the user, based also upon whether the secret mode is activated or not.

In the synchronization process, there can be a plurality of secret mode managing formats. For example, the user can synchronize all, all but secret and secret only. In the synchronization process 208, there is a query as to whether the secret flag is on 210. If the secret flag is off for particular identity data, then data not flagged may not be synchronized 212. If the secret flag is appended to particular identity data in the first application's folder, then the same identity data in different application folders can be harmonized 214. Accordingly, the flagged identity data in data folders of different applications on the communication device can have the same flagged identity data, if that data resides in the folder. When a user installs a new application or when new data (of any form) are added to the communication device's memory, for example, the synchronization process of FIG. 2 may be run to harmonize the data across the new application as well.

When an external device or external memory is accessed via the described secret-mode-capable communication device, the data in the external device or external memory can be compared against the secret mode data in the communication device. The secret mode manager as described herein can treat the external data as internal data.

Figure 3:
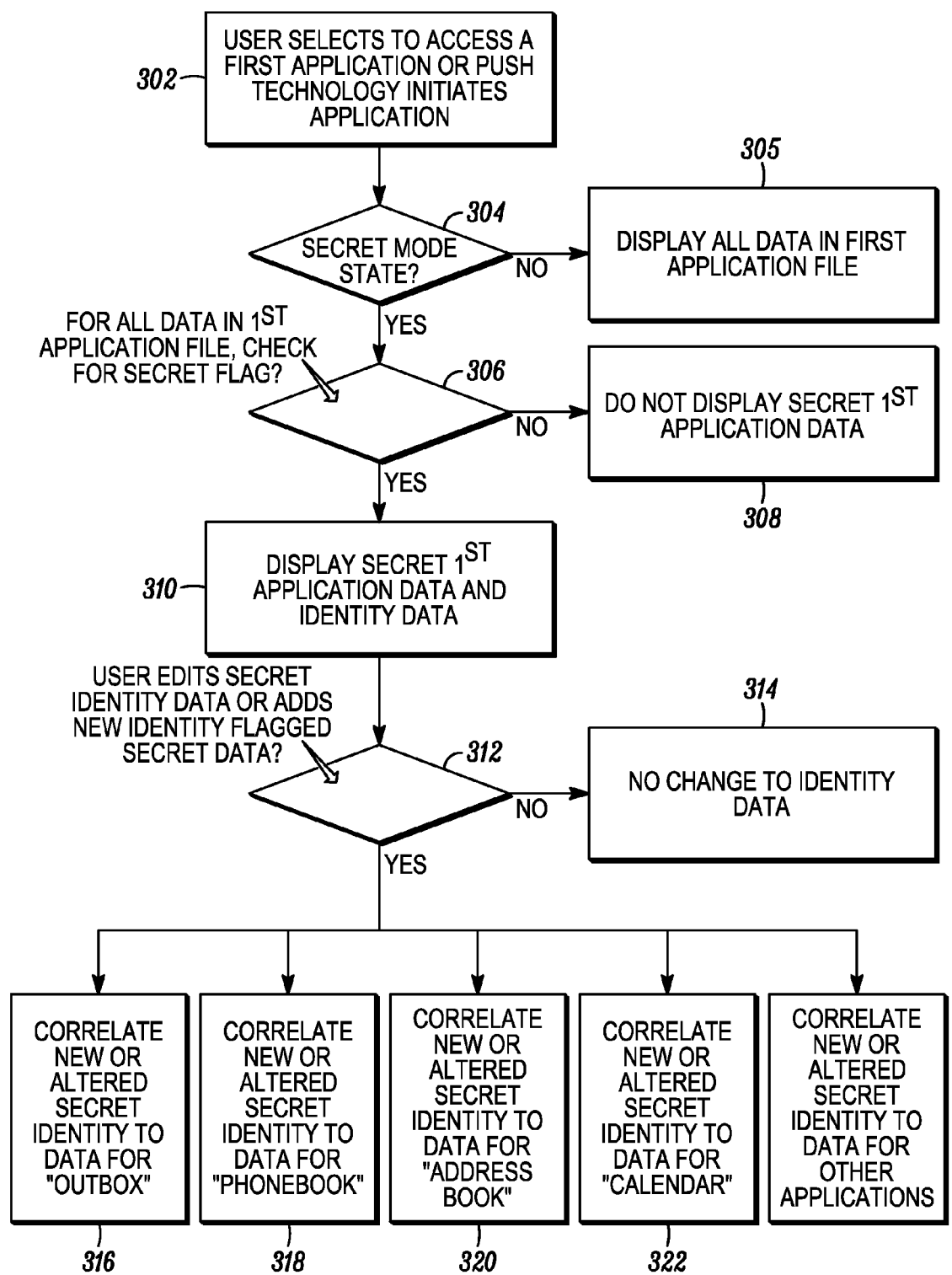
FIG. 3 is a flow chart of an example of the harmonization or synchronization method that takes place while an application is running.

FIG. 3 is a flow chart an embodiment of the synchronization or harmonization method that takes place while an application is running. Either the user selects an application, or in the case of receiving an email or a telephone call, the push technology initiates the application 302. There is a query as to whether secret mode is on or off 304. Secret mode may be turned on or off by the user. If secret mode is off 304, the application may display all identity data in the folder of the running application 305.

If secret mode is on 304, for the identity data in the applications folder, the process includes checking for secret flags 306. If any data is appended with a secret flag, that data is not displayed 308 until the user 110 specifically accesses the secret data with a password 310. The user 110 may edit secret identity data or may add new secret identity data 312. If there are no changes to any secret identity data, then the process may end 314. If the user chooses to edit secret identity data or add new identity data in the folder of the application that is currently running, the new or altered secret identity data will be updated throughout the applications that include that identity data in their folders. For example, the outbox 316, the telephone book 318, the email address book 320 and the calendar 322 may contain the same identity data that was edited or added. If for example a flag was appended to previously non-secret data, in steps 316, 318, 320 and 322 the same identity data in data folders of other applications will be updated with a secret flag.

In general, there can be different opportunities to harmonize identity data in the data folders of various applications. A number of embodiments have been above-described. As shown in FIG. 3, the user may edit the data while an application is running. Alternatively, the user 110 may edit data in a data folder in a particular application even though the application is not running. Furthermore, synchronization can take place either automatically or upon a prompt.

FIG. 4 shows a flow chart that provides general conditions for the harmonization of secret flagged data. That is, while secret mode is on 402, (i) a new application entry is created (i.e. flagged identity data is stored in the folder of an application such as the phonebook) or (ii) existing flagged identity data is edited or deleted. For all flagged identity data stored in the communication device 102 and imported to the communication device via an external memory 116 (implemented on subscriber identity module (SIM), UICC (USIM Integrated Circuit Card), a smart card, a removable memory card, or any other suitable memory device or remote server) there is an update 404 of the existing secret flagged identity data by checking if the modified application entry values match with the appropriate field of each data entry in the other applications installed on the communication device.

The update process 404 may include prompting the user for the user's choice. For example, update process may prompt the user by annunciation to make a choice whether to correlate the originally flagged secret data with other data to form similarly flagged secret data. On the other hand, the update process may prompt the user the user to make a choice as to whether to delete flagged secret data in a first one of the plurality of applications. By choosing to delete flagged secret data in one application, the update process may further prompt the user to make a choice about deleting all similarly flagged secret data associated with other applications. Alternatively, the update process may give the user the option to delete flagged secret data associated with one or more than one application. The update process accordingly can delete flagged secret data in at least a second one of the other of the plurality of applications as a result of the user's choice to delete flagged secret data in the first one of the plurality of applications.

Figure 5:
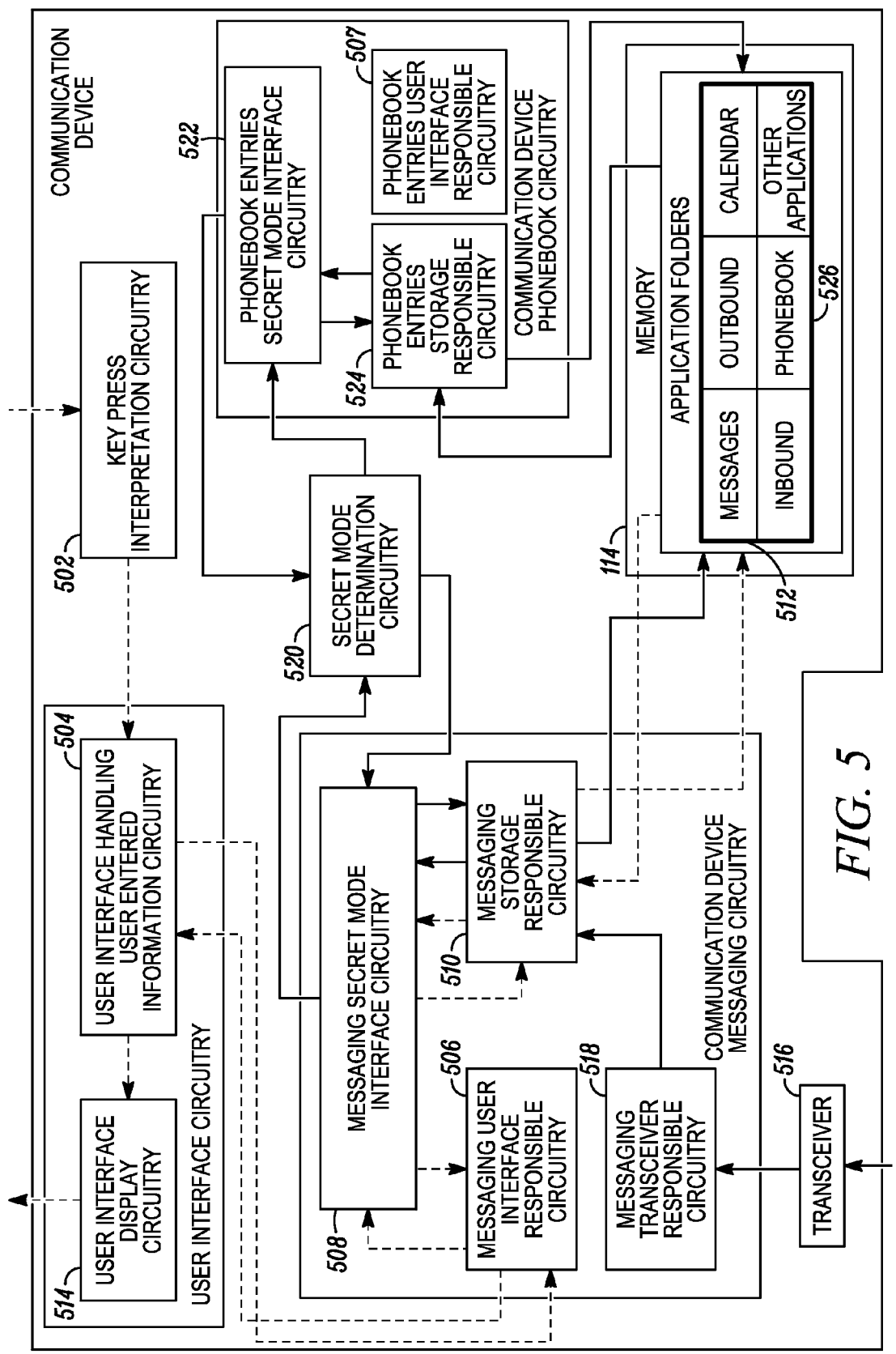
FIG. 5 depicts exemplary circuitry of the described communication device.

FIG. 5 depicts exemplary circuitry of communication device 102. In the circuitry there are two processes depicted herein. The first is directed to harmonization according to a prompt to the user interface and the second is directed to the harmonization as an application is running. While the example circuitry uses the messaging and phone book application by way of illustration, it will be understood that any and all applications, and combinations thereof are considered part of this discussion.

As discussed with respect to FIG. 2, the user may wish to manually initiate the synchronization process. In FIG. 5, the situation is considered where the secret flagged identity data is in the messaging application folder. The user 110 can provide input to the communication device 102 via key press interpretation circuitry 502 in communication with, for example, a key pad as discussed above with reference to FIG. 1. It is understood that both input and output can annunciated in any manner, including audiovisually. The user interface handling user entered information circuitry 504 initiates processing. Messaging user interface responsible circuitry 506 processes messaging instructions. (Also shown is phonebook entries user interface responsible circuitry 507 which if this example were with respect to phonebook entries, circuitry 507 would perform as circuitry 506 performs.)

The messaging secret mode interface circuitry 508 processes the messaging application folders so that any new identity data or edits are in synchronization with folders for applications containing identity data. The user can for example, edit an entry, can add a secret flag, can remove a secret flag and can choose to delete secret flagged identity data from a particular application's folder. The message storage responsible circuitry 510 processes the flagged identity data so that it may be stored in the communication device's message storage 512 and other application folders as described above.

In the event that user has provided a password to the communication device 102 to access the flagged secret identity data stored in the message storage 512, the message storage responsible circuitry 510 that maintains the data will confirm the password with the message secret mode interface circuitry 508. Access to the flagged data is provided by the message user interface responsible circuitry 506 and the user interface handling user entered information circuitry 504 allows the user interface display circuitry 514 to display the data.

Still referring to FIG. 5, the situation is considered where harmonization occurs while an application is running. In this exemplary situation, the phonebook application folder contains the flagged identity data. Accordingly, the phonebook application folder 526 is accessed to determine whether the incoming message is secret. The transceiver 516 provides data to the message transceiver responsible circuitry 518 which is in communication with the messaging storage responsible circuitry 510. The messaging secret mode interface circuitry 508 activates the secret mode determination circuitry 520.

The phonebook entries secret mode interface circuitry 522 coordinates the matching the flagged secret identity data of an incoming message with that in the phonebook folder 526. The phonebook entries storage responsible circuitry 524 in turn directs the incoming message identity data to the folder for the phonebook 526. Assuming the incoming message identity data is matched to flagged secret identity data in the phonebook folder 526, the circuit then utilizes the phonebook entries storage responsible circuit 524, the phonebook entries secret mode interface circuitry 522, the secret mode determination circuitry 520, and the message storage responsible circuitry 510 to deliver the incoming message data to the communication device's message storage 512 as flagged secret data accessible by a password code.

In this way, the circuit of FIG. 5 illustrates process steps for an incoming message display operation. As discussed above, the incoming message identity data can include a field, such as a telephone number, that matches a particular field of a particular flagged secret data in a different application's folder, in this case, the telephone book application's folder. The circuit provides the ability to automatically flag the incoming message data (based upon a flagged secret phonebook entry) to form flagged secret message data so that the now flagged secret message data is not displayed when the secret mode is on. While the user may mark a message as secret, it is understood that the user can have the option to flag or not flag as secret all correlated data. That is, if a phonebook entry or other data are flagged as secret, and are mapped to a message outbox or a message inbox, that message can be hidden or not, based on the user's desire.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method in a communication device having a secret mode and a plurality of applications, the method comprising:

flagging a first identity data as secret data in a first one of the plurality of applications to form originally flagged secret data;

correlating the originally flagged secret data with other identity data associated with at least one of the other of the plurality of applications to process the other identity data into similarly flagged secret data, wherein correlating comprises processing a second identity data to determine if the second identity data includes identity data that is substantially the same as the identity data of originally flagged secret data; and flagging the second identity data to form similarly flagged secret data when it is determined that the second identity data includes identity data that is substantially the same as that of the originally flagged secret data; and concealing the originally flagged secret data and the similarly flagged secret data in the plurality of applications when secret mode is activated.

2. A method as recited in claim 1 wherein the communication device has memory, the method further comprising:

correlating originally flagged secret data with other identity data stored in a memory device different from the communication device's memory.

3. The method of claim 1, wherein the second identity data is at least one of incoming call data, phonebook data, recent call data, message data, or calendar data.

4. A communication device including a secret mode synchronization instruction module and a plurality of applications, the secret mode synchronization instruction module comprising:
   a flagging instruction module for flagging a first identity data as secret data in a first one of the plurality of applications to form originally flagged secret data;
   a correlating instruction module for correlating the originally flagged secret data with other identity data associated with at least one of the other of the plurality of applications, while one of the plurality of applications is running, to process the other identity data into similarly flagged secret data;
   a processing instruction module for processing a second identity data to determine if the second identity data includes identity data that is substantially the same as the identity data of originally flagged secret data; and
   a flagging module for flagging the second identity data to form similarly flagged secret data when it is determined that the second identity data includes identity data that is substantially the same as that of the originally flagged secret data.

5. A communication device as recited in claim 4, wherein the synchronization instruction module correlates originally flagged secret data with other identity data, while the plurality of applications is disengaged.

6. A communication device as recited in claim 4 wherein the communication device is selected from a group comprising a cellular telephone, a mobile telephone, a cordless telephone, a wired telephone, a messaging device, a personal digital assistant, a palm pilot and a personal computer.

7. A communication device as recited in claim 4 wherein the communication device has memory, and wherein the correlating instruction module further correlates originally flagged secret data with other identity data stored in a memory device different from the communication device's memory.

8. The communication device of claim 4, wherein the second identity data is at least one of incoming call data, phonebook data, recent call data, message data, or calendar data.

9. A method in a communication device having a secret mode and a plurality of applications having particular data and a user input device, the method comprising:
   flagging the first data as secret data in a first one of the plurality of applications to form originally flagged secret data;
   prompting a user by annunciation to make a choice whether to correlate the originally flagged secret data with other data associated with at least one of the other of the plurality of applications to process the other data into similarly flagged secret data; and
   correlating the originally flagged secret data with other data associated with at least one of the other of the plurality of applications to process the other data into flagged secret data according to the user's choice, wherein correlating comprises:
      searching a second identity data to identify other data including a field matching a particular field of the originally flagged secret data; and
      flagging the second identity data to form flagged secret data when a field of the other data matches the particular field of the originally flagged secret data.

10. A method as recited in claim 9 further comprising:
    prompting the user to make a choice as to whether to delete flagged secret data in a first one of the plurality of applications; and
    deleting flagged secret data in at least a second one of the other of the plurality of applications as a result of the user's choice to delete flagged secret data in the first one of the plurality of applications.

11. A method as recited in claim 9 wherein the communication device has memory, the method further comprising:
    correlating originally flagged secret data with other identity data stored in a memory device different from the communication device's memory.

12. The method of claim 9, wherein the second identity data is at least one of incoming call data, phonebook data, recent call data, message data, or calendar data.

* * * * *